Patented Aug. 30, 1938

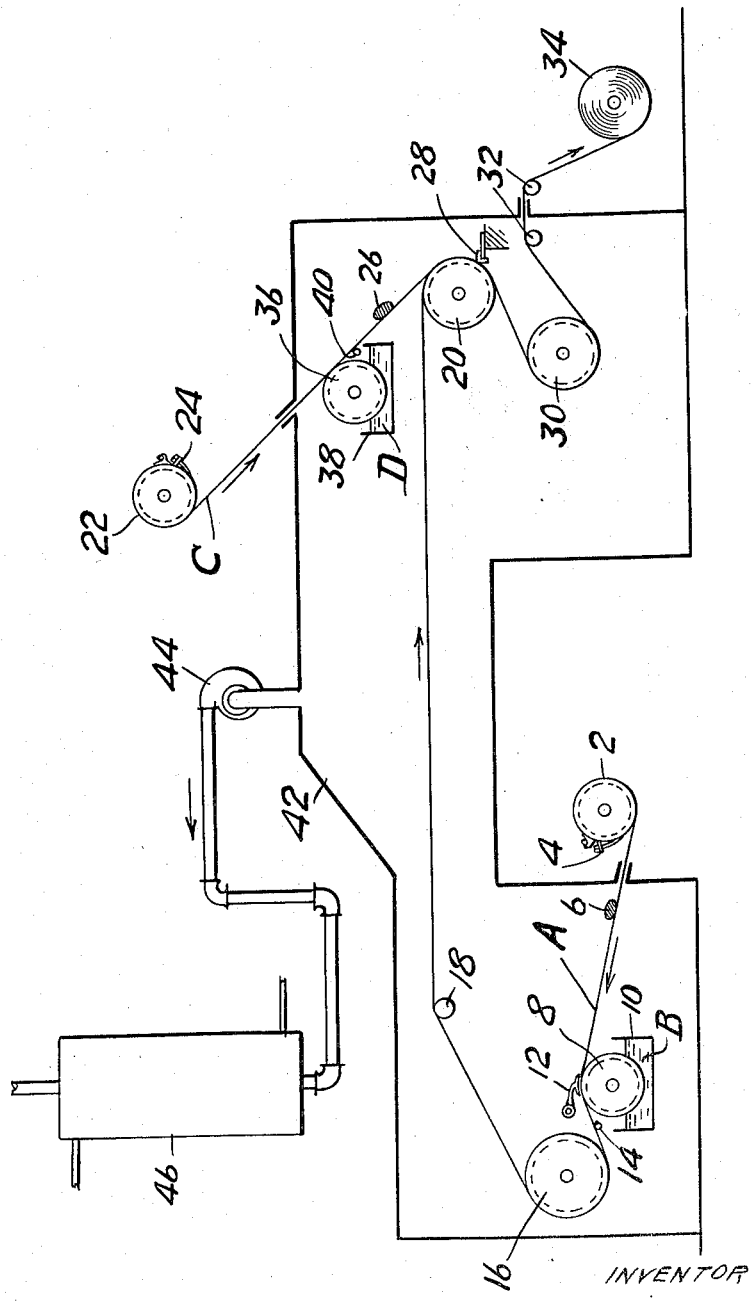

2,128,739

UNITED STATES PATENT OFFICE 2,128,739

LAMINATED GLASSINE PAPER

Cornelius M. Connor, Ardmore, Pa., assignor to The Glassine Paper Company, West Conshohocken, Pa., a corporation of Delaware Application July 6, 1935, Serial No. 30,077

6 Claims. (Cl. 154—46)

This invention relates to a method for the production of a laminated paper and the product thereof, the paper forming the basis of the product being specifically what is known as "glassine" paper.

This application is in part a continuation of my application Ser. No. 660,227, filed March 10, 1933.

In the patent to Robert F. Nelson, No. 1,965,719, dated July 10, 1934, there is described a process for joining sheets of glassine paper to form a laminated product, a film of wax being interposed between the sheets. The paper sheets, which are formed by sheeting pure sulphite pulp, preferably of spruce, wetting the sheeted product and ironing out the wetted sheet by the application of heat and pressure, are brought together in such manner that a film of wax is interposed between them, being melted at the time of such interposition with the result that the two sheets are secured together by the wax or, perhaps more properly, by the vacuum produced by the use of a very thin film of wax which prevents the entry of air at the edges of the laminated sheet. The laminated paper so produced is transparent and at the same time is moisture-proof to a high degree while the objections to ordinary waxed transparent paper are obviated. For example, the surface may be printed upon in the same fashion as ordinary paper inasmuch as there is no paraffine on the outer surface and, furthermore, the outer sheets also prevent contact between the contents of a package made of the material with the wax so as to avoid the imparting of taste of wax to the contents as commonly occurs with the use of ordinary waxed paper. The glassine paper itself is greaseproof and accordingly the product is particularly adapted for the formation of containers of food materials which may contain grease.

The paper just described is very satisfactory for most purposes but due to the use of wax it has some drawbacks when elevated temperatures are involved. Heating of the paper to an extent which will melt the wax may produce a separation of the sheets at their edges. Furthermore, in certain cases where appearance is of primary importance as, for example, where the paper is used for the production of fancy boxes, it may happen that the heat of the fingers combined with the pressure exerted by someone handling the paper in the process of manufacture of the box, or the like, will cause a partial melting of the wax and change in thickness of the film so that spots having an appearance somewhat resembling grease spots will appear. It is the object of the present invention to provide a product and method of making the same which will have the desirable characteristics of the laminated product just described but which will avoid certain shortcomings of this product of the type indicated above. Specifically in accordance with the present invention, glassine paper is laminated by the interposition of a film of a material deposited from solution in an organic solvent, which film functions the same as the wax but which will not be readily melted, and which also serves to better secure the sheets together not only by a vacuum producing action but also to some extent by adhesion. The film may be of various types and may comprise, for example, resins, either natural or synthetic, rubber, likewise either natural or synthetic, chlorinated rubber, cellulose esters, or combinations of these with each other, or with wax, or adulterating materials capable of modifying the properties of the film to desired degrees.

The method in accordance with the present invention is carried out so as to insure obtaining a product of high quality, that is, having perfect uniformity and a high degree of transparency. To attain these ends certain manipulations are necessary during the laminating process to prevent any disturbance of uniformity or the like which would produce a lowgrade product. Certain conditions of the laminating material, for example, must be maintained to avoid the presence of too much solvent and still insure that the film forming material is in proper condition when the sheets are brought together.

Specific objects of the invention will be apparent from the following description read in conjunction with the accompanying drawing in which the figure is a diagrammatic elevation of a mechanism designed to carry out a preferred form of the process.

There is indicated at 2 a supply roll of water calendered sulphite spruce pulp paper, known as glassine paper, which is of the character described above and more fully discussed in the patent to Chester E. Beecher, No. 1,936,375, dated November 21, 1933. This paper, as previously indicated, is transparent and greaseproof to a high degree.

A brake indicated at 4, and preferably of the character more fully described in the Nelson patent referred to above, controls the tension of the paper A which is passing from the supply roll 2. The sheet A passes under a spreader bar 6 to insure its smoothness and then passes over a roller 8 which is immersed in a medium B contained in a receptacle 10. Scrapers 12 underlie the free edges of the sheet and prevent them from receiving a coating of the material B so as to avoid the squeezing out of this material over the edges with the resulting soiling of the subsequent rolls. A scraper 14 in the form of a rotating rod removes the excess of the material B which drops back into the receptacle 10. The roller 8 may be driven by suitable gearing or may be stationary or rotated merely by frictional contact with the web.

The material B consists of a film forming, preferably resinous, material carried either in solution, in an emulsion in the disperse phase, or in a molten state. Where "solvent" is mentioned hereafter this term will be understood to include the continuous phase of an emulsion in which the film forming material is suspended. Before describing the composition of the material B the remainder of the apparatus will be first discussed.

Following engagement with the scraper 14 the web passes about a roller 16 which in general will be heated so as to raise the temperature of the material B carried by the web to promote evaporation of the solvent. The material B may also be heated in its container 10 for the same purpose.

The paper then passes over an idler 18 and through a suitable path during the progress through which evaporation of solvent takes place. During such passage the temperature may be maintained by additional heating means in the form, for example, of steam heated rollers over which the web passes. Alternatively, no additional heating may be provided particularly where the solvent is quite volatile at ordinary temperatures. If it is desired to recover the solvent, the web may be enclosed from the point where the material B is applied to the point of substantially complete evaporation of the solvent, for example by a housing 42, and the vapors may be drawn off by a suction pump 44 and condensed in a cooled condenser 46. In any event, however, it is desirable to enclose the part of the apparatus just indicated to avoid the dispersion of solvent vapors throughout the plant, the vapors being discharged through a stack if not recovered.

The web then passes over a roller 20 which, in general, will be heated to a point at which the film forming material will be tacky even in the substantial absence of solvent. During the passage of paper about this roller the solvent, if not already evaporated, is substantially completely evaporated although, as will be pointed out later, the evaporation of the final traces of solvent may only take place after the material has been completely formed.

A second supply roll 22 similar to 2 and controlled by brake 24 supplies a sheet C which passes from the roller under or over a spreader 26 to remove irregularities and then meets the sheet A preferably making with the plane of approach of sheet A substantially the angle illustrated in the drawing. As it meets the sheet A the air is pressed out and the tacky material B begins to perform its function of adhering the two sheets together. A pressure roll or presser bar 28 preferably faced with felt, or a like soft material, presses the sheets together after they have been in contact for a substantial angle about the roller 20, which angle preferably ranges between 25° and 40° and is desirably about 33°. The two sheets now in close contact with the film forming material between them pass about a roller 30 and idlers 32 and the product is finally reeled as indicated at 34. The roller 30 may be heated to still maintain the sheets at a temperature above that at which the film forming material becomes tacky. Thereafter, before the final product is reeled its passage may be such that cooling will take place so as to bring the temperature to a point where the film forming material assumes its ordinary state. During such passage to the reeling mechanism the residual amounts of solvent may be substantially dissipated by evaporation through the sheets.

The apparatus just described is substantially that of the Nelson application referred to above in which there are disclosed certain details of the parts, for example, the construction of the scrapers 12, the brakes 4 and 24 and the presser 28.

The glassine sheet passing from the supply 2 may be either plain or waxed on the side to which the film forming material is applied. Likewise the sheet C may be waxed on the side which is to contact with the film forming material. Preferably, if such waxing is to be included, it is the sheet C which is waxed while A is unwaxed so that the wax will not be disturbed by the application of the solution or suspension of the film forming material and the action of the scraper 14. Wax may be applied to sheet C from a molten supply D in a container 38 by means of a roller 36. The use of wax is sometimes desirable particularly where extraordinary moistureproof characteristics are required. Various waxes may be used, e. g. paraffine (crystalline or microcrystalline), carnauba, beeswax, etc. The most desirable product and the most readily made in a perfectly satisfactory fashion is that which results from the waxing of the sheet C only. In general, however, waxing is not necessary but plain glassine sheets are fed at both A and C.

While glassine paper is referred to herein, and is preferably used because of its greaseproof characteristics so that it is unnecessary to look for this characteristic in the laminating material, it will be understood that other greaseproof papers or water calendered papers, which have, as a result of the water calendering, some greaseproof properties, may be used. The various materials mentioned below as suitable for effecting the lamination are, to a substantial extent, also greaseproof, but it is desirable that the grease contained in any materials wrapped by the laminated product forming the subject matter hereof should fail to penetrate the paper and hence should not come into contact with the intermediate resinous layer. It is further desirable that the paper should have such characteristics that the laminating material should not penetrate to the exterior surfaces even while substantial solvent is still present. This result is, in general, characteristic of greaseproof papers. If this last condition is met, it is possible to print on the outside surface of the laminated material without interference to the printing by the material of the intermediate layer. It is also possible to laminate preprinted material with the assurance that in the addition of the resinous material the printing will not be affected.

The material B may vary considerably in its nature. It preferably comprises a solution containing one or more resinous, film forming materials such as crude or bleached shellac, Bakelite or other phenol resins, glyptal resins, phthalic anhydride resins, or other natural or synthetic resins, natural or synthetic rubber, chlorinated rubber, rosin esters, for example the ethyl or glyceryl esters, rosin, or the like. Such materials may be dissolved in suitable solvents depending upon their individual solubilities, the solvents used being volatile ones such as carbon tetrachloride, xylol, petroleum spirits, benzol, acetone, alcohols, ether, esters such as butyl or ethyl acetate, carbon bisulphide, chloroform, ethylene dichloride, or the like. If mixtures of such materials are used, the solvent may be either a solvent for all the components of the mixture or a mixture of solvents for the individual components, used in such proportions as to secure complete miscibility and solution.

As examples of the type of material B used may be cited a solution of crude or bleached shellac in alcohol, Bakelite in acetone, or rosin esters in alcohol, acetone or other solvents or mixtures of solvents, which are found desirable in producing solutions of proper viscosity and having proper characteristics of evaporation to leave the resinous material in a desired condition upon the sheet at the time the other sheet is contacted therewith. Rosin may be used in solution, for example, in petroleum ether, or it may form the disperse phase of an aqueous emulsion in which soap, for example, may be used as the emulsifying agent. Similarly other resinous materials of the type listed above may be applied in soap emulsions.

As specific examples of materials which may be used, phenolic resins, such as Bakelite, may be dissolved in solvents such as carbon tetrachloride, trichlorethylene, fusel oil, butanol, or mixtures such as 50% carbon tetrachloride and 50% xylene, naphtha, or toluene, or such as 60% fusel oil or butanol, 40% ethyl alcohol and 20% ethyl acetate. In order to render the laminated material more plastic, there may be added camphor, methyl, ethyl or butyl o-benzoyl benzoate, or dibutyl phthalate in amount from 0.5% to 10% of the resin. In such cases the solvent is preferably one containing an alcohol. Waterproof characteristics may be improved by adding a wax such as paraffin, carnauba, or montan wax in an amount from 0.5% to 10% of the resin, using one of the wax-dissolving solvents.

Using phthalic anhydride resins, the solvents may be, for example, acetone, or mixtures such as 10% ethyl acetate and 90% acetone, 10% acetone, 50% ethylene glycol monoethyl ether acetate, and 40% butanol or fusel oil, or 5% carbon tetrachloride, 65% acetone and 30% butanol or fusel oil. In this case also suitable plasticizer as above may be added in amount varying from 0.5% to 15% of the resin, or a wax may be added in amounts varying from 0.5% to 5% of the resin.

Ester gum or other abietic acid esters may be used in various of the above solvents or in mixtures such as 50% acetone, 25% butanol or fusel oil, and 25% xylene, carbon tetrachloride or toluene. Waxes or plasticizers may be added as in the preceding examples.

The resins may be used in various concentrations depending entirely on the amount of resin to be used per unit area of the finished product. The resin may form 50% or more of the solution which may be diluted for use to any desired concentration.

The film forming material may also comprise cellulose ester such as the acetate or nitrate used alone in solution or, preferably, in admixture with some resinous material or wax. These cellulose esters may be dissolved in alcohol-acetone mixtures or other solvents and if wax is to be included there may be added sufficient other solvent such as chloroform to maintain both the ester and the wax in a uniform solution. A similar use of a mixture of miscible solvents may be made in order to use a mixture of a cellulose ester and a resinous substance of the character above indicated.

Sulphur may also be incorporated if the solvent is of a suitable type such as carbon bisulphide.

In case it is desirable to produce a colored or tinted product a suitable coloring matter may be incorporated in the solution or suspension B so that even though the sheets themselves are not colored the final product will be colored by transmitted light. In fact, if the sheets are also slightly tinted and the intermediate material has a different color they will have a different appearance in reflected and transmitted light.

As indicated above, besides merely the resin and solvent there may be included in the composition B other materials designed to maintain the final film in a plastic condition so as to prevent breaking from flexure of the laminated sheet. For example, glycerine or diethylene glycol may be incorporated to not only act as plasticizers but also as hygroscopic agents or diluents to maintain the film in a more or less pliant condition. Other plasticizers may include castor oil, dibutyl phthalate, tricresyl phosphate, camphor, esters of o-benzoyl benzoate, etc. All of these materials of course remain in the final product after evaporation of the volatile solvent. Plasticizers are particularly desirable where cellulose esters are included.

The incorporation of wax to augment the moistureproof characteristics of the laminated product has been mentioned above. The wax may be incorporated by inclusion in the solution with the other film forming components, such as resinous materials or cellulose esters, but is preferably applied, as indicated in the drawing, through the medium of a roller 36 carrying it to the sheet C from a supply D. The wax is preferably in molten condition and is spread in an even film over the sheet, the excess being removed by a roller indicated at 40, which is similar to the roller 14. If the temperature of the roller 20 is above the melting point of the wax, the fact that the wax is in a molten condition and that the films on both sheets A and C are very thin will normally prevent the formation of any separate films of wax and the other material and instead there will be formed a film in which the wax and the other material or materials, are uniformly distributed in a homogeneous condition. If, however, there is any substantial amount of solvent still carried by the sheet A, in which solvent wax is insoluble, then there is preferably included in that solvent included in material B a substantial amount of a higher boiling solvent for the wax so that the combined solvent is capable of dissolving the wax and thus avoiding inhomogeneity. Alternatively, wax in solution may be applied by the roller 36 and the web C may be given a more extended path to permit the substantial evaporation of this solvent before web C reaches the roller 20.

Although glassine paper is injured by prolonged exposure to temperatures above 225° F., the chilling occurring when a sheet is rapidly moved away from contact with an applying roller such as 8 is such that it does no harm to apply to the web material at a temperature substantially exceeding that mentioned. Consequently, the resinous materials may, if desired, be applied in a molten condition without any solvent or with a rather small amount of solvent sufficient merely to reduce the viscosity and the amount of material per unit area to such extent that the desired thickness of film is attained. Of course, the subsequent heating during the process should be such that the temperature on any portion of the web for any prolonged time is below any damaging temperature.

The glassine paper is not entirely impervious to the solvents of the type mentioned but is substantially so during the short interval required for the laminating process. The solutions will not substantially permeate the sheets and consequently a true film is produced between them, the surface permeation which does occur tending to promote the adhesion. In the preferred operation, the solution of the resinous material or cellulose ester, preferably substantially concentrated, is applied hot and the sheet may be further heated by a roller such as 16 or auxiliary heaters between the rollers 16 and 20 so as to substantially evaporate the solvent during such passage. Most desirably, the temperatures are so maintained that, if a resinous material is used, it is above its softening point so that where the two sheets come together it is in a tacky condition, with the result that adhesiveness is promoted and uniformity of film also obtained. Following the intimate contact produced by the pressure 28, the product, if proper care is taken in securing uniformity, will be entirely uniform in appearance without streaks or bubbles and is also quite transparent substantially to the same degree as two sheets of glassine would be without any interposed laminating material. In fact, in the cases of the use of certain resins, such as shellac, the transparency may be increased in the laminating process.

By reason of the fact that the film forming material does not reach the surfaces of the laminated product, it does not interfere with printing upon those surfaces; furthermore, neither the film forming material nor any other material incorporated in the film can come into contact with food materials contained in a package made of the laminated product. Accordingly, no undesirable tastes are imparted thereto. Since the paper itself is greaseproof and since the laminating materials used form a substantially moisture-proof film, the final product is both greaseproof and moistureproof.

It is found that very attractive results may be obtained by printing on one or both of the sheets to be laminated on the surface or surfaces which are to be inner ones and then laminating the sheets as described above. This makes possible the use of aniline inks, which are protected by the film forming material and consequently are not injured by moisture. Because of the high transparency of the laminated product, this interior printing is substantially as sharp and brilliant as exterior printing and where tinted sheets are used the effect is sometimes quite desirable, since the fact that the printing is not on the surface is readily noticeable. The glassine which is laminated in accordance with this process may, of course, be of the usual colorless transparent variety or, alternatively, may be colored to various degrees as indicated in my application Ser. No. 717,925, filed March 29, 1934.

It will be obvious that various departures can be made from the specific process described without departing from the invention as defined in the following claims. For example, various advantages of the invention may be secured if only one of the laminated sheets is glassine.

What I claim and desire to protect by Letters Patent is:

1. A grease and moisture proof laminated sheet material comprising essentially sheets of glassine joined by an intermediate film substantially confined to the inner surfaces of the sheets and comprising primarily a water-insoluble resinous material and wax, the resinous material being in sufficient amount to secure substantially increased adhesiveness as compared with wax alone, and the wax being in sufficient amount to render the film substantially moisture proof.

2. A grease and moisture proof laminated sheet material comprising essentially sheets of paper, of which at least one is glassine, joined by an intermediate film substantially confined to the inner surface of said glassine sheet and comprising primarily a water-insoluble resinous material and wax, the resinous material being in sufficient amount to secure substantially increased adhesiveness as compared with wax alone, and the wax being in sufficient amount to render the film substantially moisture proof.

3. A grease and moisture proof laminated sheet material comprising essentially sheets of glassine joined by an intermediate film substantially confined to the inner surfaces of the sheets and comprising primarily a water-insoluble resinous material, wax, and a plasticizer for said resinous material for rendering the film flexible, the resinous material being in sufficient amount to secure substantially increased adhesiveness as compared with wax alone, and the wax being in sufficient amount to render the film substantially moisture proof.

4. A grease and moisture proof laminated sheet material comprising essentially sheets of paper, of which at least one is glassine, joined by an intermediate film substantially confined to the inner surface of said glassine sheet and comprising primarily a water-insoluble resinous material and wax, the resinous material being in sufficient amount to secure substantially increased adhesiveness as compared with wax alone, and the wax being in sufficient amount to render the film substantially moisture proof, the wax being present in an amount ranging from 0.5% to 10% of the resinous material.

5. A grease and moisture proof laminated sheet material comprising essentially sheets of glassine joined by an intermediate film substantially confined to the inner surfaces of the sheets and comprising primarily a water-insoluble resinous material and wax, the resinous material being in sufficient amount to secure substantially increased adhesiveness as compared with wax alone, and the wax being in sufficient amount to render the film substantially moisture proof, the wax being present in an amount ranging from 0.5% to 10% of the resinous material.

6. A grease and moisture proof laminated sheet material comprising essentially sheets of glassine joined by an intermediate film substantially confined to the inner surfaces of the sheets and comprising primarily a water-insoluble resinous material, wax, and a plasticizer for said resinous material for rendering the film flexible, the resinous material being in sufficient amount to secure substantially increased adhesiveness as compared with wax alone, and the wax being in sufficient amount to render the film substantially moisture proof, the wax being present in an amount ranging from 0.5% to 10% of the resinous material, and the plasticizer being present in an amount ranging from 0.5% to 15% of the resinous material.

CORNELIUS M. CONNOR.